United States Patent [19]

Mabuchi

[11] 4,420,704
[45] Dec. 13, 1983

[54] SMALL ELECTRIC MOTOR

[75] Inventor: Takaichi Mabuchi, Matsudo, Japan

[73] Assignee: Mabuchi Motor Co., Ltd., Japan

[21] Appl. No.: 310,629

[22] Filed: Oct. 13, 1981

[30] Foreign Application Priority Data

Oct. 23, 1980 [JP] Japan .................... 55-151495[U]

[51] Int. Cl.³ ........................................ H02K 13/06
[52] U.S. Cl. .................................. 310/220; 310/238
[58] Field of Search ..................... 310/220–225, 310/248, 238

[56] References Cited

U.S. PATENT DOCUMENTS

| 3,487,248 | 12/1969 | Kameko et al. | 310/220 |
| 4,319,153 | 3/1982 | Mabuchi | 310/221 |
| 4,322,650 | 3/1982 | Mabuchi | 310/220 |

FOREIGN PATENT DOCUMENTS 52-29906  3/1977  Japan .................... 310/220

Primary Examiner—Donovan F. Duggan
Attorney, Agent, or Firm—McGlew and Tuttle

[57] ABSTRACT

A small electric motor having an insulating cylinder fixedly fitted to a rotating shaft of a motor rotor, a plurality of commutator segments disposed at equal spacing in the angular positional direction of the insulating cylinder and brushes for making sliding contact with the cummutator segments. Each of the commutator segments has a commutator terminal formed by bending an end of the segment and led out for external connection. The insulating cylinder has an enlarged diameter portion, on which adhesive reservoirs are provided. An electrically conductive adhesive is injected into the reservoirs and deposited in such a manner as to bridge the adjoining commutator segments.

6 Claims, 3 Drawing Figures

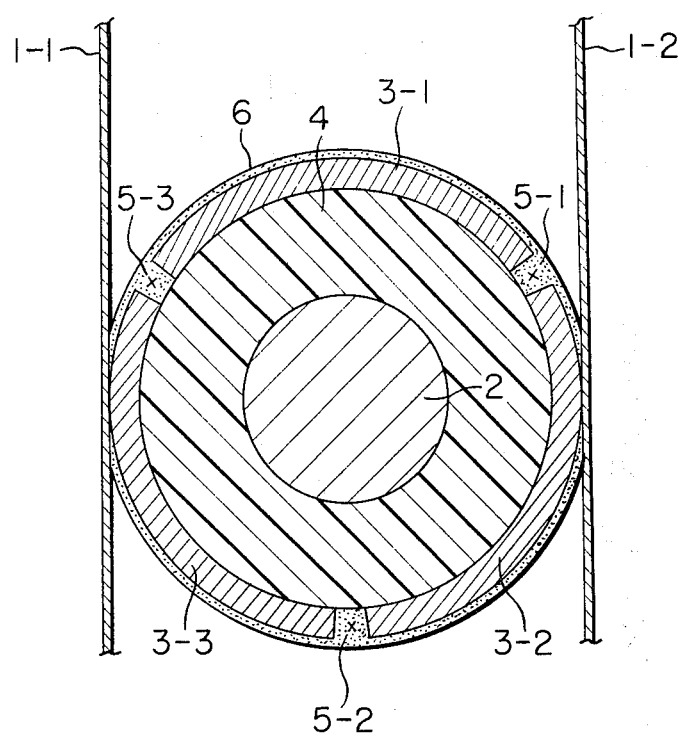

SMALL ELECTRIC MOTOR

BACKGROUND OF THE INVENTION

1. Field of the Invention

This invention relates generally to a small electric motor, and more particularly to a small electric motor wherein adhesive reservoirs are provided at positions where commutator segments fitted to the small electric motor do not make sliding contact with brushes, that is, at the base portion of the commutator segments from which commutator terminals are led out for external connection, and an electrically conductive adhesive is injected into the reservoirs and deposited in such a manner as to bridge the adjoining commutator segments.

2. Description of the Prior Art

Sparks generated between commutator segments and brushes during rotation have heretofore been the cause of unwanted phenomena, such as damage to brushes or commutator segments due to electrical wear, and electrical noise. Consequently, a great number of means have so far been proposed to prevent spark generation. Among such means, a method of connecting capacitors, linear resistors, or non-linear resistors such as varistors across each commutator segment is generally considered effective.

These measures, however, involve an increase in the number of components, leading to increased manufacturing costs. Furthermore, variability in the characteristics of components, particularly those of varistors, poses a problem. To solve these problems, the present inventor has proposed a means of easily preventing spark and electrical noise generation by interposing electrically conductive grease between each commutator segment and setting the electrical resistance values of the electrically conductive grease within a proper range.

Where the motor is required to rotate at an exceptionally high speed, however, the electrically conductive grease, which is a viscous fluid, is very apt to splash away due to centrifugal force. This may cause not only contamination of the inside of the motor but also changes in the amount of deposition of the electrically conductive grease between each commutator segment, making it difficult to maintain electrical resistance between commutator segments within a proper range. At high temperatures, this tendency is further aggravated because the lowered viscosity of the grease increases the amount of splash.

Another spark quenching means using electrically conductive adhesive in place of the electrically conductive grease has also been considered. The electrically conductive adhesive, which hardens in a relatively short period after application, has the advantages of not splashing away due to centrifugal force and contributing to securing the commutator segments to the insulating cylinder. However, injecting the electrically conductive adhesive into narrow gaps between the commutator segments in such a manner that the adhesive does not cover the sliding surface of the commutator segments nor builds excessively up above the sliding surfaces of the commutator segments involves dexterity and careful attention. If the electrically conductive adhesive is accidentally applied to the sliding surfaces of the commutator segments or deposited excessively up above the sliding surfaces, the excess adhesive must be wiped off. This requires additional labor. Furthermore, a problem which is common between the electrically conductive adhesive and grease is that the sliding contact of the brush with the commutator segments causes the abrasion products of the electrically conductive adhesive or part of the electrically conductive grease to stick to the sliding surfaces of the commutator segments, deteriorating the continuity between the commutator segments and the brushes, or causing spark generation in some cases, quite contrary to original expectations. This can be prevented by injecting electrically conductive adhesive or grease into gaps between the commutator segments at a position where the commutator segments do not make contact with the brushes. In a small electric motor whose compact structural design requires dimensional limitations on each component, however, the length of the commutator segments in the axial direction of the motor is as short as a few millimeters. This makes it difficult to inject electrically conductive adhesive into the gaps between the commutator segments at a position where the commutator segments do not make contact with the brushes. In addition, limited space makes it impossible to apply the required amount of electrically conductive adhesive or grease.

Meanwhile, in order to set the resistance of the electrically conductive adhesive bridging the commutator segments to a predetermined value in accordance with the characteristics of the motor, the resistance of the electrically conductive adhesive can be changed by varying the amount of the electrically conductive substance to be added to the electrically conductive adhesive, or preferably, by varying the coating amount of a single type of electrically conductive adhesive. With the aforementioned structure of the motor, however, several types of electrically conductive adhesives having different resistance values have to be used because of limited coating space and accordingly the limited coating amount of electrically conductive adhesive.

SUMMARY OF THE INVENTION

This invention is intended to overcome the aforementioned problems. It is an object of this invention to provide a small electric motor wherein reservoirs are provided at the base portions of commutator segment terminals in such a manner as to bridge the commutator segments, and electrically conductive adhesive is injected into the reservoirs.

BRIEF DESCRIPTION OF THE DRAWINGS

FIG. 1 is an enlarged cross-section of the commutator portion of a conventional small electric motor in which electrically conductive grease is applied on the commutator thereof.

FIG. 2 (B) is a front view taken substantially along the line A—A' of FIG. 2 (A).

DETAILED DESCRIPTION OF THE EMBODIMENT

Figure 2A:
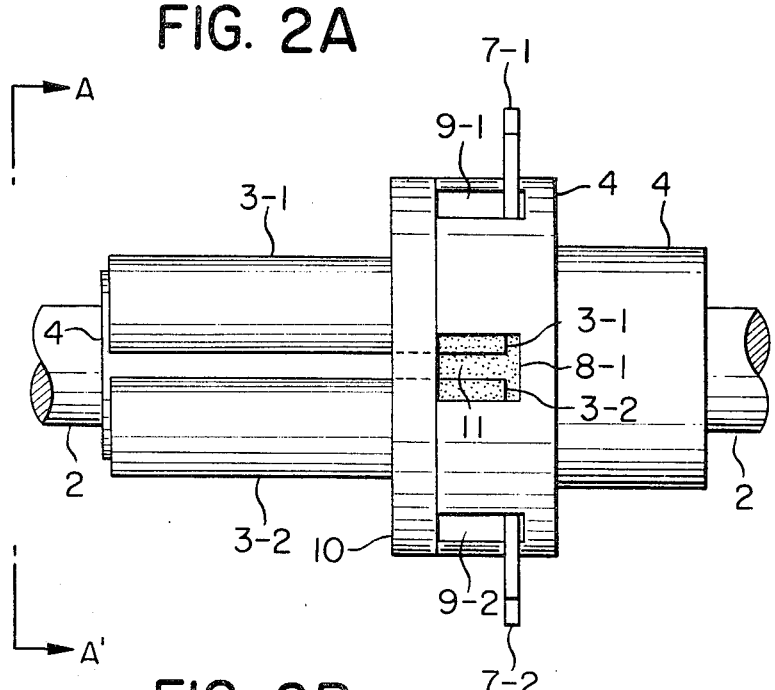
FIG. 2 (A) is a side elevation of the commutation portion of a small electric motor embodying this invention.

FIG. 1 is an enlarged cross-section of the commutator portion of a conventional small electric motor in which an electrically conductive grease is applied on the commutator thereof. In the figure, reference numerals 1-1 and 1-2 refer to metallic brushes; 2 to a rotor shaft; 3-1 through 3-3 to commutator segments; 4 to an insulating cylinder; 5-1 through 5-3 to gaps between the commutator segments; 6 to an electrically conductive grease which is a mixture of one or more types of metallic powders of silver and/or copper and fine particles of graphite and/or carbon.

In the figure, the electrically conductive grease is applied on the surfaces of the commutator segments 3-1 through 3-3 as well as the gaps 5-1 through 5-3 between the commutator segments 3-1 through 3-3 so that the commutator segments 3-1 through 3-3 are bridged with an electric resistance having a value within a proper range. This reduces the generation of sparks between the commutator and the brushes and prevents the resulting generation of electric noise. This arrangement, however, has a disadvantage that the electrically conductive grease is undesirably splashed away, as described above.

Figure 2B:
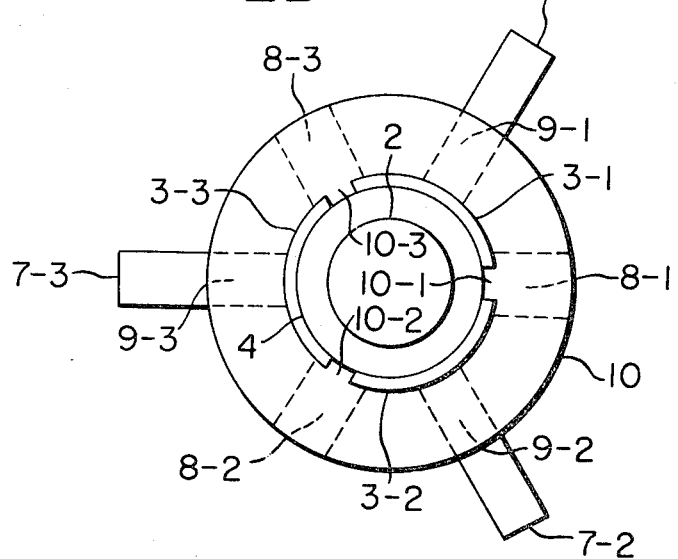

FIGS. 2 (A) and (B) illustrate the construction of the commutation portion of a small electric motor embodying this invention. The same numerals as in FIG. 1 correspond with the same parts in the figure. Reference numerals 7-1 through 7-3 refer to commutator terminals, which are formed by bending the commutator segments 3-1 through 3-3 at the base portion thereof and led out for external connection; 8-1 through 8-3 to reservoirs; 9-1 through 9-3 to guide grooves for accommodating the commutator terminals 7-1 through 7-3; 10 to an insulating washer; 10-1 through 10-3 to projections of the insulating washer 10; and 11 to an electrically conductive adhesive, which is given a predetermined resistance value by mixing an appropriate amount of silver powder or graphite, carbon and other fine particles with an adhesive, respectively.

As is evident from FIGS. 2 (A) and (B), the insulating cylinder 4 is fixedly fitted to the rotor shaft 2 and has an enlarged diameter portion 4a. On the insulating cylinder 4, are provided are an annular groove 46 into which the commutator segments 3-1 through 3-3 are inserted; the guide grooves 9-1 through 9-3 for accommodating the commutator terminals 7-1 through 7-3; and the reservoirs 8-1 through 8-3 provided on the enlarged diameter protion of the insulating cylinder for receiving the electrically conductive adhesive 11. After the commutator segments 3-1 through 3-3 are disposed on the insulating cylinder 4, as shown in the figure, the insulating washer 10 is inserted while engaging with the commutator segments 3-1 through 3-3, whereby the commutator segments 3-1 through 3-3 are firmly secured on the insulating cylinder 4. On the insulating washer 10, are formed the projections 10-1 through 10-3 for engaging with gaps between the commutator segments 3-1 through 3-3.

Thus, the reservoirs 8-1 through 8-3 are separated with the insulating washer 10 from the portions of the commutator segments 3-1 through 3-3 (to the 1ft of washer 10 in FIG. 2(a) ) where the brushes make sliding contact with the commutator segments 3-1 through 3-3. Consequently, when a predetermined amount of the electrically conductive adhesive 11 is injected into each of the reservoirs 8-1 through 8-3, the electrically conductive adhesive 11 hardens within the reservoirs 8-1 through 8-3 while bridging the adjoining pairs of the commutator segments 3-1 through 3-3 in each of the reservoirs 8-1 through 8-3.

As a result, each of the commutator segments 3-1 through 3-3 is bridged with a predetermined electrical resistance, and at the same time, fixed to the insulating cylinder 4 at predetermined intervals.

With such an arrangement as has been described above, the reservoirs 8-1 through 8-3 are provided at the gap portions between the commutator segments 3-1 through 3-3 where the commutator segments do not make sliding contact with the brushes, and the electrically conductive adhesive is injected into the reservoirs thus formed. This ensures that the injected electrically conductive adhesive is prevented from adhering to the sliding surfaces of the commutator segments or the brushes to adversely affect the continuity between the commutator segments and the brushes. Furthermore, since injection of the electrically conductive adhesive is a relatively simple work and there is no limitation in the amount of injection, any desired resistance value can be selected by varying the amount of injection. This will prove economical because the need for preparing several types of electrically conductive adhesives to adjust the resistance value is eliminated. In addition, the use of electrically conductive adhesive, which hardens in a short period after injection into the reservoirs, not only contributes to the fastening of the commutator segments to the insulating cylinder but also prevents the electrically conductive adhesive from splashing away during the high-speed rotation of the motor, thus maintaining the resistance value between the commutator segments at a constant level. Thus, the present invention makes it possible to provide a small electric motor which can stably control spark generation between the commutator segments and the brushes as well as the resulting generation of electrical noises.

What is claimed is:

1. A commutator portion of a small electric motor, comprising:

a rotatable motor rotor shaft;

an insulating cylinder fixed to said shaft having an enlarged diameter portion, said enlarged diameter portion having a plurality of spaced guide grooves therein;

a plurality of commutator segments circumferentially spaced on a portion of said insulating cylinder, each commutator segment having a commutator terminal extending through a respective one of said guide grooves and a gap defined between adjacent commutator segments;

said enlarged diameter portion of said insulating cylinder having a reservoir defined therein for accommodating each gap;

an electrically conductive adhesive disposed in each reservoir and deposited in such a manner as to bridge each gap, said electrically conductive adhesive being a mixture prepared by mixing both or one of metallic powder and carbon powder with an adhesive which hardens; and means connected to said enlarged diameter portion for separating each reservoir from portions of said commutator segments adapted to be contacted by brushes of the small electric motor.

2. A commutator portion according to claim 1, wherein said enlarged diameter portion of said insulating cylinder has an annular groove for receiving each commutator segment.

3. A commutator portion according to claim 1, wherein said means for separating comprises an insulating washer having an inside diameter for engagement around outer surfaces of said commutator segment, said insulating washer connected to said enlarged diameter portion of said insulating cylinder for covering each of said reservoirs.

4. A commutator portion according to claim 3, wherein said insulating washer includes an inner projection projecting into each gap defined between adjacent commutator segments.

5. A commutator portion according to claim 6, wherein said enlarged diameter portion includes an annular groove for receiving each commutator segment, said annular groove communicating with each reservoir and each of said guide grooves.

6. A commutator portion of a small electric motor, comprising
a rotatable rotor shaft;
an insulating cylinder fixed to said shaft;
a plurality of commutator segments disposed at equal spacing in an angular positional direction of said insulating cylinder;
each commutator segment having a sliding contact portion for sliding contact with brushes of the motor, and a non-contact portion;
said insulating cylinder having an enlarged diameter portion with a plurality of circumferentially spaced guide grooves and a plurality of circumferentially spaced guide grooves and a plurality of circumferentially spaced reservoirs defined therein;
said commutator segments defining gaps therebetween extending over each sliding contact portion and each non-contact portion, at least a portion of each gap extending on each non-contact portion disposed in a respective one of said reservoirs,
an insulating washer having an inside diameter fitted to an outer surface of said commutator segment at non-contact portions thereof, said insulating washer engaged with said enlarged diameter portion and covering each reservoir; and
an electrically conductive adhesive prepared by mixing electrically conductive fine particles with an adhesive disposed in each reservoir for bridging said gap in each reservoir.

* * * * *